Inventor
V. E. Schmiedeknecht,
By
Attorney

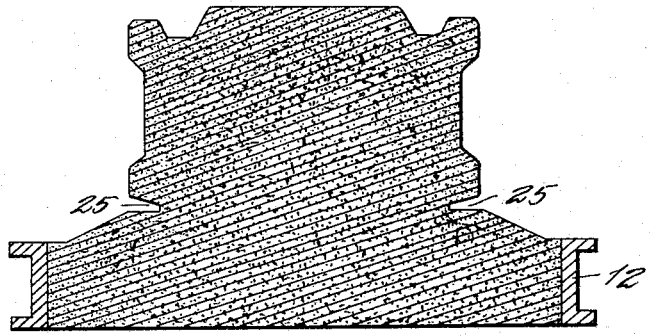
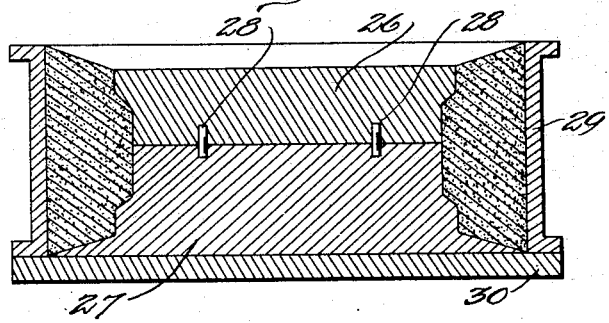
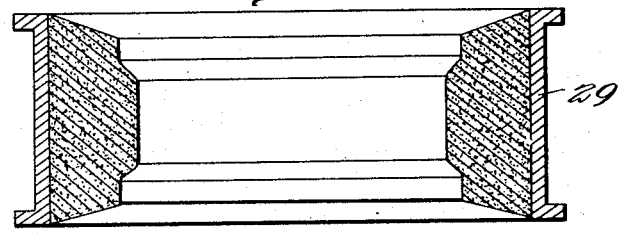

Oct. 11, 1932.  V. E. SCHMIEDEKNECHT  1,882,652
MOLDING HOLLOW WARE ARTICLES
Filed Dec. 7, 1931  4 Sheets-Sheet 3

Inventor
V. E. Schmiedeknecht,
By
Attorney

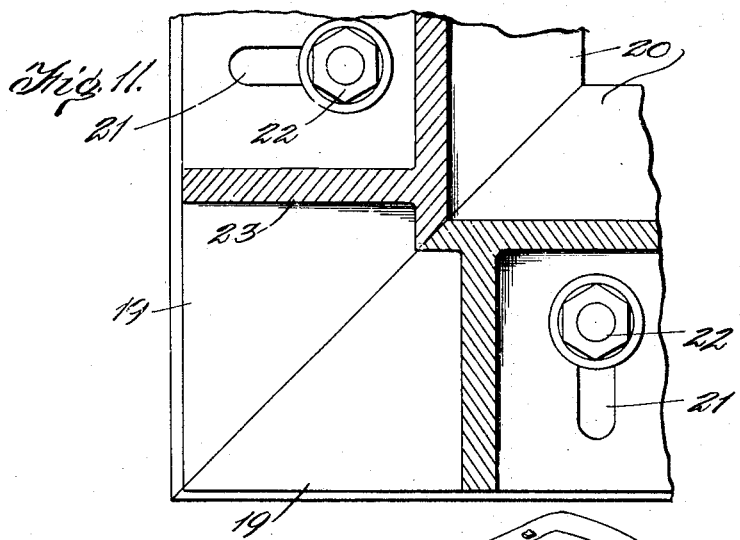
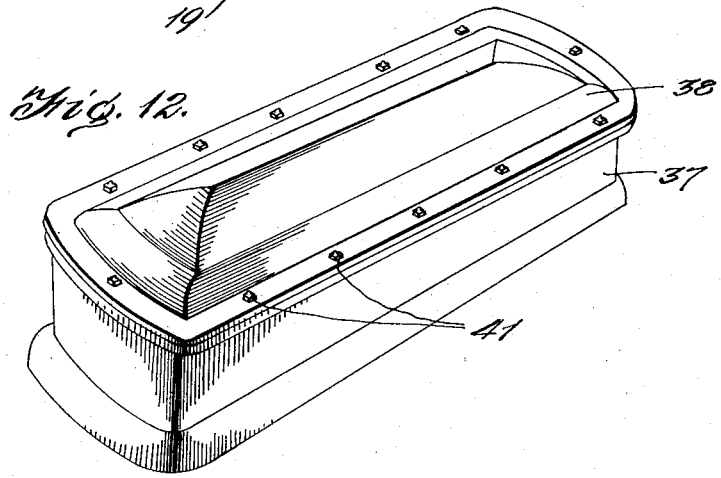

Patented Oct. 11, 1932

1,882,652

UNITED STATES PATENT OFFICE

VICTOR E. SCHMIEDEKNECHT, OF LOUISVILLE, KENTUCKY, ASSIGNOR TO STANDARD SANITARY MANUFACTURING COMPANY, OF PITTSBURGH, PENNSYLVANIA

MOLDING HOLLOW-WARE ARTICLES

Application filed December 7, 1931. Serial No. 579,535.

This invention relates to molding and has special reference to the molding of articles of hollow ware having inwardly projecting flanges.

More especially the invention relates to apparatus for molding hollow-ware articles having inwardly projecting flanges.

In the molding of articles of this character it has been customary heretofore to provide cores for the interior of such articles. These cores are formed in core boxes and are afterwards baked in core ovens. The exterior is molded by the process known as green sand molding where no panels or recesses are formed but where such panels are to be formed other cores are necessary. The process thus requires an expensive core for the interior and other cores for the panels. All this adds greatly to the expense of manufacture of such articles and, in addition cores of this character are extremely apt to become misplaced as the metal is poured with the consequent production of defective castings. Moreover, new cores have to be formed for each article made.

The principal objects of the present invention include the provision of a mold forming apparatus whereby the mold for the interior may be made of green sand just as is the mold for the exterior; the provision of means whereby panels may be molded in green sand without the necessity of using cores; arrangement of the apparatus so that internal flanges may be molded and the pattern withdrawn without danger of the space left for the metal being distorted; and the provision of apparatus which may be used for producing a very great many molds for castings without appreciable wear.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 4 is a view of this part of the mold with the special apparatus removed and the drag thus formed being ready to receive the cheeks and cope portions.

Figure 5 is a cross section through the cheek portion of a mold showing the first step in the formation of this part.

Figure 6 is a view similar to Figure 5 but with the pattern removed.

Figure 11 is an enlarged section through a portion of the apparatus on the line 11—11 of Figure 3.

Figure 12 is a perspective view of a metal casket formed by molding apparatus of this character.

Figure 1:
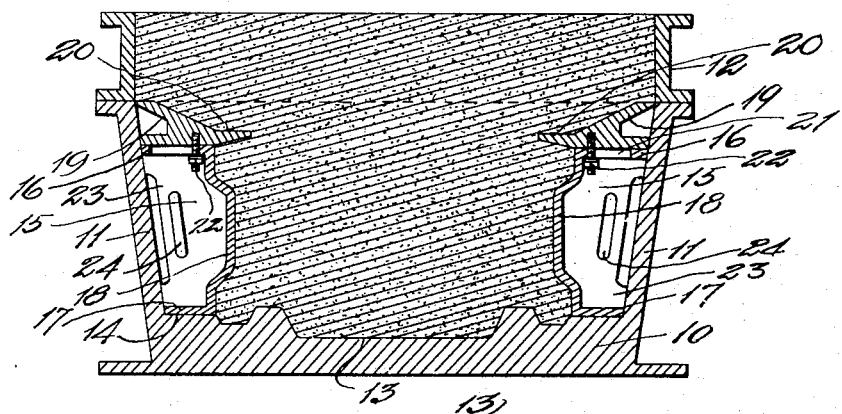
Figure 1 is a cross section through apparatus for molding the drag and forming that portion of the mold which forms the hollow interior of the casting and its internal flanges, the view showing the first step therein.
Figure 2:
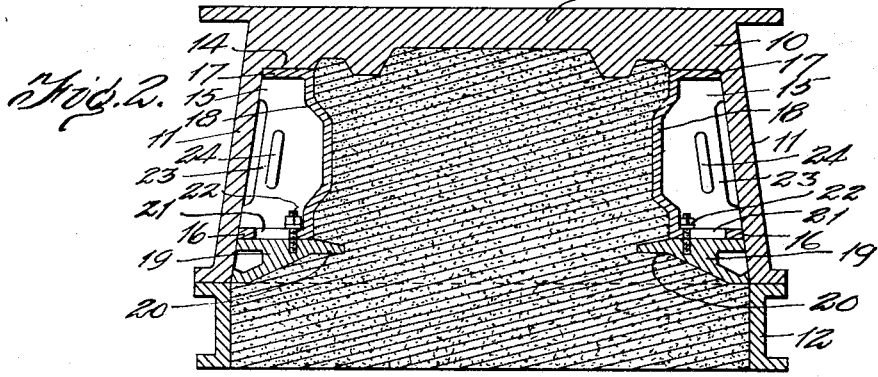
Figure 2 is a similar view showing the second step in the formation of this part of the mold.

For the purpose of illustrating the applicability of the invention to the formation of large hollow-ware articles the present disclosure has been directed especially to the molding of a casket body having internal flanges at its upper edge or rim. It is to be understood, however, that the invention is by no means restricted to the casting of casket bodies but is adapted to the formation of any hollow-ware articles of that general character wherein the previous method of formation of the mold heretofore commonly required coring. It is therefore to be understood that when the term "casket" or the term "casket body" is used herein the term is to be interpreted as covering all similar articles.

There will now be considered the apparatus for forming the drag of the mold and the manner of using the same. This part is shown in Figures 1 to 4 inclusive wherein it will be seen that there is provided a two part flask having a major portion provided with a bottom 10 from which rises flaring side walls 11. The minor portion 12 rests at first on the upper edges of the flaring walls and its sides form vertical continuations of the walls 11. Hollow-ware articles are commonly cast bottom up and this procedure is followed in the present instance. For this purpose the central portion 13 of the bottom 10 is shaped to conform in contour to the interior surface of the bottom of the casket. Surrounding this central portion is a shoulder 14 preferably horizontal. On this shoulder or shelf rest the side patterns 15 which are preferably of hollow metal and are of general wedge shape to fit snugly against the sides 11. These side patterns each have an upper flange 16 and a lower flange 17 connected by a web 18, the flanges 17 resting on the shelf. The web is so shaped that its inner face conforms to the contour of the inner surface of the casket to be cast. Resting on the flanges 16 are the flange formers 19 each having an inner edge portion 20 forming the flange pattern. The upper parts or faces of these flange formers lie flush with the upper edges of the former body sides 11 so that the flask 12 extends upwardly therefrom. The flanges 16 are provided with transverse slots 21 wherethrough extend bolts 22 which engage in the flange formers 19. These flange formers are thus slidably mounted on the flanges 16. Ribs 23 having hand holes 24 are provided in these formers 15.

Figure 3:
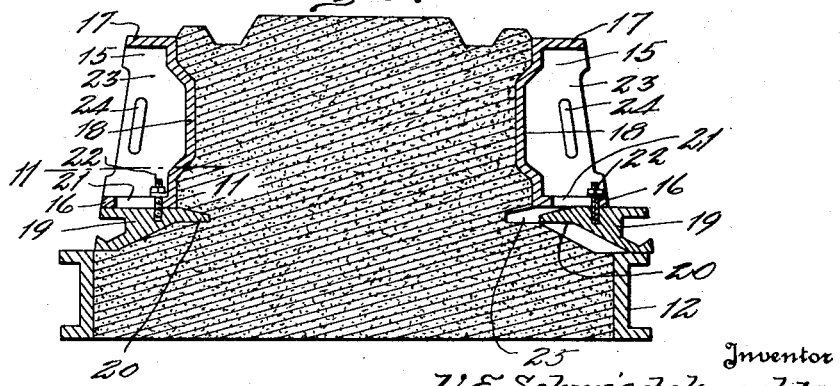
Figure 3 is a similar view showing the third and fourth steps in the formation of this part.

In using this portion of the device the parts are positioned as in Figure 1 with the bottom 10 down and the side patterns and flange formers assembled within the main former body. The main former body thus forms a casing around the inside surface patterns and flange formers. Properly tempered molding sand is then rammed into the flasks until they are filled, any surplus sand projecting above the flask 12 being removed with a straight edge or strickle. The flask and the assembly and their contents are now inverted and set on a platform or level place on the molding floor. Next the former body is lifted straight up and removed, this being readily accomplished by reason of the provision of the flaring sides 11. This leaves the parts as shown in Figure 3. The flange formers are now moved outwardly without disturbing the patterns 15 which serve to prevent any irregular movement of the flange formers which would tend to distort the flange chamber 25, this being shown at the right of Figure 3. It will be observed that these formers are supported on the flask 12 during this movement. Finally the side patterns are lifted outwardly and this part of the mold is left ready for assembly of the rest of the mold. It will now be seen from Figure 4 that the upper part of the body of green sand corresponds to the core usually employed.

The next step is the formation of the cheek mold and this is shown in Figures 5 and 6. Here there is provided a split pattern consisting of an upper part 26 and a lower part 27 positioned in proper relation by the dowels 28. This pattern is placed in a cheek flask 29 of the same length and width as the flask 12 so that it may rest thereon when assembled, this cheek flask being divided into halves by vertical diagonal plane. The flask and patterns rest on a molding board or floor 30 and green sand rammed between the pattern and flask, the top being bevelled off by using a strickle to the shape shown. The pattern is now removed in the usual manner. It is, of course, to be understood that this pattern is of such dimension and shape as to conform to the outer surface of the sides of the article. The flasks 29 and their contents will now be in the condition shown in Figure 6 after which they are divided diagonally and placed around the core and upon flask 12.

Figure 7:
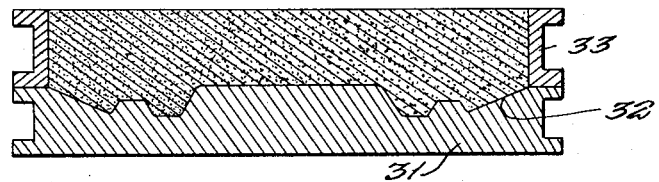
Figure 7 is a cross section through the cope portion of the mold showing the pattern for this part in place.
Figure 8:
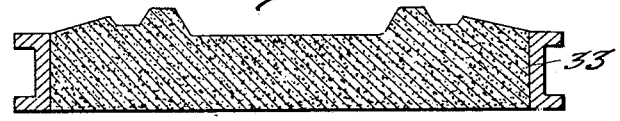
Figure 8 is a view similar to Figure 7 but showing the cope just after pattern has been removed.
Figure 9:
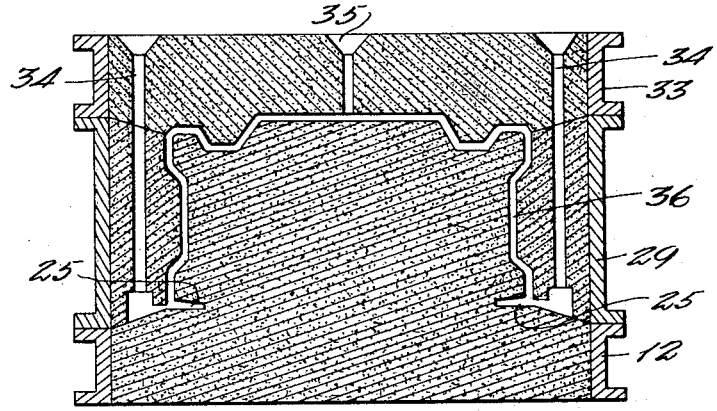
Figure 9 is a cross section through the mold with the parts assembled and ready for the metal to be poured.
Figure 10:
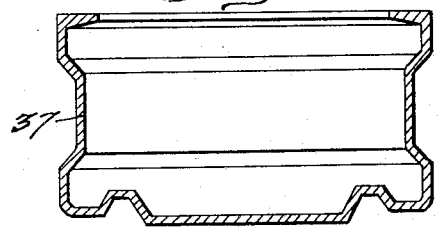
Figure 10 is a cross section through the formed article.

There remains now to mold the cope for the exterior of the bottom and means for this purpose are shown in Figures 7 and 8. Here a pattern board 31 having its upper surface shaped to conform to the exterior surface of the bottom of the casket is provided. Around this part of the pattern extends a bevel 32. On this pattern board is set a shallow flask 33 conforming in length and width to the flask 29 so as to rest properly thereon when assembled. Green sand is then rammed in this flask, the flask inverted and the pattern board lifted off. The flask with the sand therein is again inverted and placed evenly on the flask 29 as shown in Figure 9. The usual pouring gates 34 and riser 35 are formed and the mold is now ready to receive the metal in the space 36. It will be observed that the entire molding is done with green sand and no core material, such as core sand, flour and molasses, is employed nor are there any baked cores. When the metal has been poured the flasks are removed and the sand cleared away thus leaving the molded article as in Figures 10 and 12 at 37.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device for hollow molding, a temporary former having side walls, and cheek patterns removably fitted within said former along said side walls and having their inner faces conforming in shape and size to the inner surfaces of the sides of the article to be cast, said cheek patterns being separable from each other upon removal of the temporary former from around the patterns.

2. In a device for hollow molding, a temporary former having side walls, cheek patterns removably fitted within said flask along said side walls and having their inner faces conforming in shape and size to the inner surfaces of the sides of the article to be cast, said cheek patterns being separable from each other upon removal of the temporary former from around the patterns, and a bottom for said temporary former having its inner surface between said cheek patterns conforming to the inner surface of the bottom of the article to be cast.

3. In a device for hollow molding, a temporary former having side walls, cheek patterns removably fitted within said flask along said side walls and having their inner faces conforming in shape and size to the inner surfaces of the sides of the article to be cast, said cheek patterns being separable from each other upon removal of the temporary former from around the patterns, and internal flange patterns slidably mounted on said cheek patterns to slide transversely thereof.

4. In a device for hollow molding, a temporary former having side walls, cheek patterns removably fitted within said former along said side walls and having their inner faces conforming in shape and size to the inner surfaces of the sides of the article to be cast, said cheek patterns being separable from each other upon removal of the temporary flask from around the patterns, a bottom for said temporary flask having its inner surface between said cheek patterns conforming to the inner surface of the bottom of the article to be cast, and internal flange patterns slidably mounted on said cheek patterns to slide transversely thereof.

5. In a device for hollow molding, a temporary former having flaring side walls, and wedge shaped cheek patterns removably fitted within said former and held thereby in assembled relation, the inner faces of the cheek patterns conforming in shape and size to the inner surfaces of the sides of the article to be cast, said cheek patterns being separable from each other upon removal of the temporary former from around the patterns.

6. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary flask from around the patterns, and a bottom for said flask having the portions adjacent the walls forming a shelf on which the cheek patterns rest and having the inner surface between the cheek patterns conforming in shape to the inner surface of the bottom of the article to be cast.

7. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, and internal flange patterns slidably mounted on said cheek patterns to slide transversely thereof.

8. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, a bottom for said former having the portions adjacent the walls forming a shelf on which the cheek patterns rest and having the inner surface between the cheek patterns conforming in shape to the inner surface of the bottom of the article to be cast, and internal flange patterns slidably mounted on said cheek patterns to slide transversely thereof.

9. In a device for hollow molding, a temporary former having side walls, cheek patterns removably fitted within said former along said side walls and having their inner faces conforming in shape and size to the inner surfaces of the sides of the article to be cast, said cheek patterns being separable from each other upon removal of the temporary former from around the patterns, and a permanent drag flask resting on top of the walls of the temporary former during filling of the mold with sand, said permanent drag flask forming the support for the molded sand upon removal of the temporary former and patterns.

10. In a device for hollow molding, a temporary former having side walls, cheek patterns removably fitted within said former along said side walls and having their inner faces conforming in shape and size to the inner surfaces of the sides of the article to be cast, said cheek patterns being separable from each other upon removal of the temporary former from around the patterns, a bottom for said temporary former having its inner surface between said cheek patterns conforming to the inner surface of the bottom of the article to be cast, and a permanent drag flask resting on top of the walls of the temporary flask during filling of the mold with sand, said permanent drag flask forming the support for the molded sand upon removal of the temporary flask and patterns.

11. In a device for hollow molding, a temporary former having side walls, cheek patterns removably fitted within said flask along said side walls and having their inner faces conforming in shape and size to the inner surfaces of the sides of the article to be cast, said cheek patterns being separable from each other upon removal of the temporary former from around the patterns, internal flange patterns slidably mounted on said cheek patterns to slide transversely thereof, and a permanent drag flask resting on top of the walls of the temporary flask during filling of the mold with sand, said permanent drag flask forming the support for the molded sand upon removal of the temporary former and patterns.

12. In a device for hollow molding, a temporary former having side walls, cheek patterns removably fitted within said flask along said side walls and having their inner faces conforming in shape and size to the inner surfaces of the sides of the article to be cast, said cheek patterns being separable from each other upon removal of the temporary former from around the patterns, a bottom for said temporary former having its inner surface between said cheek patterns conforming to the inner surface of the bottom of the article to be cast, internal flange patterns slidably mounted on said cheek patterns to slide transversely thereof, and a permanent drag flask resting on top of the walls of the temporary former during filling of the mold with sand, said permanent drag flask forming the support for the molded sand upon removal of the temporary flask and patterns.

13. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, and a permanent drag flask resting on top of the walls of the temporary former during filling of the mold with sand, said permanent drag flask forming the support for the molded sand upon removal of the temporary flask and patterns.

14. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the articles to be cast, said cheek patterns being separable from each other upon removal of the temporary former from around the patterns, a bottom for said flask having the portions adjacent the walls forming a shelf on which the cheek patterns rest and having the inner surface between the cheek patterns conforming in shape to the inner surface of the bottom of the article to be cast, and a permanent drag flask resting on top of the walls of the temporary former during filling of the mold with sand, said permanent drag flask forming the support for the molded sand upon removal of the temporary former and patterns.

15. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, internal flange patterns slidably mounted on said cheek patterns to slide transversely thereof, and a permanent drag flask resting on top of the walls of the temporary former during filling of the mold with sand, said permanent drag flask forming the support for the molded sand upon removal of the temporary former and patterns.

16. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, a bottom for said flask having the portions adjacent the walls forming a shelf on which the cheek patterns rest and having the inner surface between the cheek patterns conforming in shape to the inner surface of the bottom of the article to be cast, internal flange patterns slidably mounted on said cheek patterns to slide transversely thereof, and a permanent drag flask resting on top of the walls of the temporary former during filling of the mold with sand, said permanent drag flask forming the support for the molded sand upon removal of the temporary former and patterns.

17. In a device for hollow molding, a temporary former having side walls, cheek patterns removably fitted within said flask along said side walls and having their inner faces conforming in shape and size to the inner surfaces of the sides of the article to be cast, said cheek patterns being separable from each other upon removal of the temporary former from around the patterns, a permanent drag flask resting on top of the walls of the temporary former during filling of the mold with sand, said permanent drag flask forming the support for the molded sand upon removal of the temporary former and patterns; in combination with a cheek flask adapted to support the mold for the outer surfaces of the article sides and adapted to rest on the permanent drag flask upon removal of the temporary former, and a cope flask adapted to carry the mold for the exterior of the article bottom and resting on said cheek flask.

18. In a device for hollow molding, a temporary former having flaring side walls, wedge shaped cheek patterns removably fitted within said flask and held thereby in assembled relation, the inner faces of the cheek patterns conforming in shape and size to the inner surfaces of the sides of the article to be cast, said cheek patterns being separable from each other upon removal of the temporary former from around the patterns, a permanent drag flask resting on top of the walls of the temporary former during filling of the mold with sand, said permanent drag flask forming the support for the molded sand upon removal of the temporary former and patterns; in combination with a cheek flask adapted to support the mold for the outer surfaces of the article sides and adapted to rest on the permanent drag flask upon removal of the temporary former, and a cope flask adapted to carry the mold for the exterior of the article bottom and resting on said cheek flask.

In testimony whereof I affix my signature.

VICTOR E. SCHMIEDEKNECHT.